Figure 1:
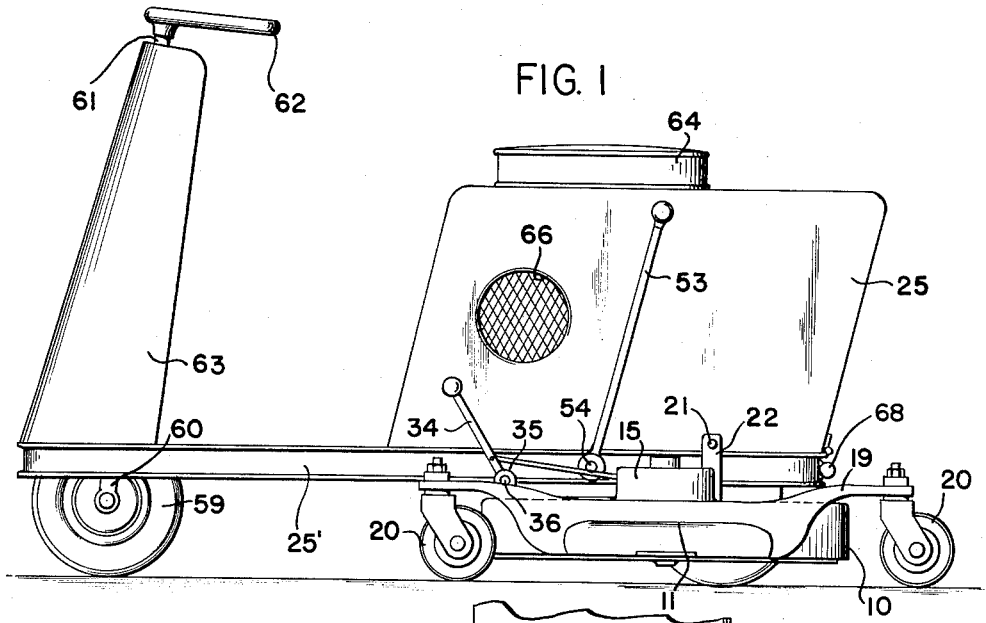

April 11, 1961  A. SMITH ET AL  2,978,857
LAWN MOWER AND PROPELLING VEHICLE
Filed Sept. 26, 1958  2 Sheets-Sheet 1

INVENTORS
B.D. BAGGS, JR.
ALEXANDER SMITH

BY *Ayates Dowee*

ATTORNEY

April 11, 1961 A. SMITH ET AL 2,978,857
LAWN MOWER AND PROPELLING VEHICLE
Filed Sept. 26, 1958 2 Sheets-Sheet 2
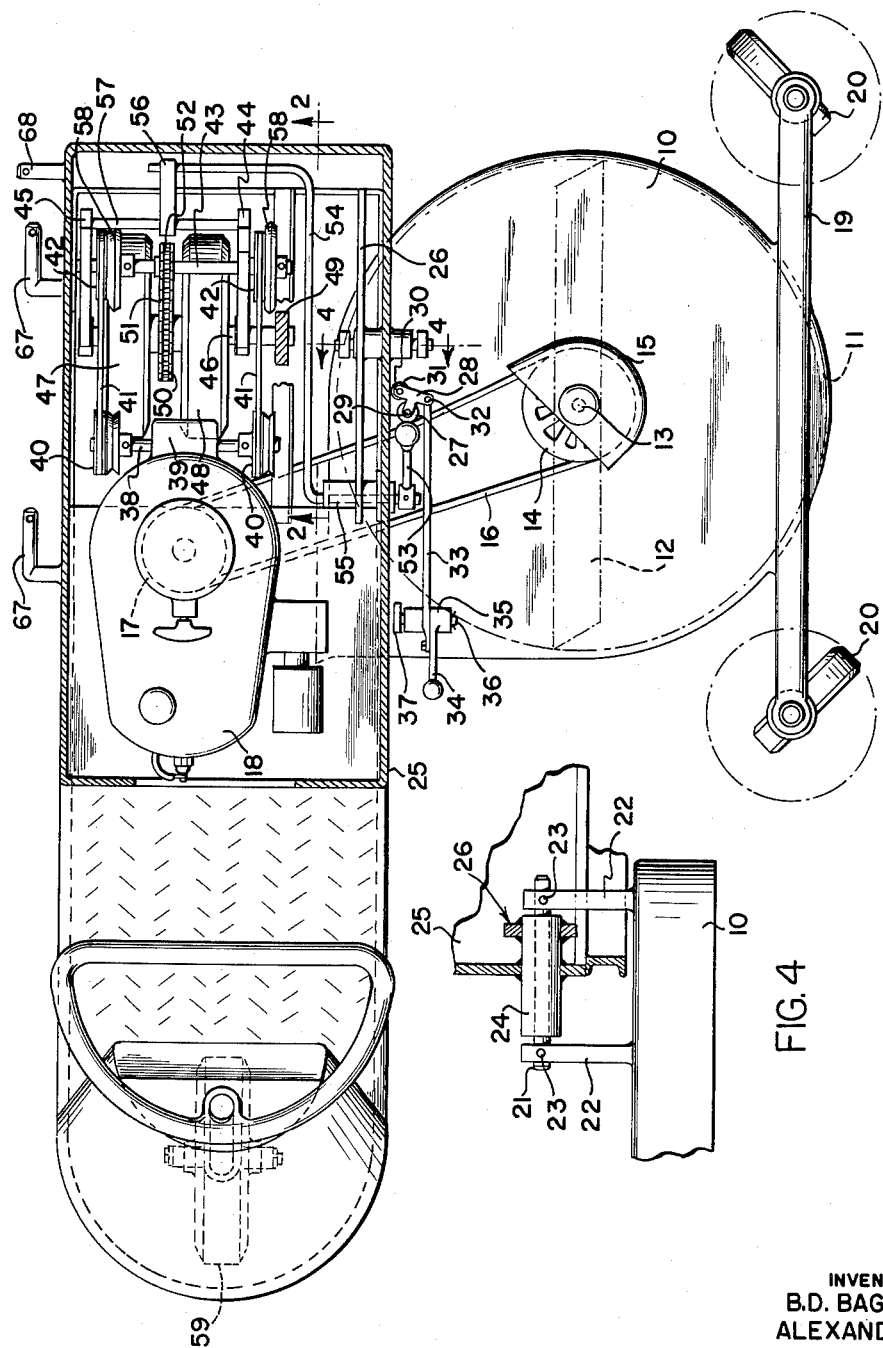
INVENTORS
B.D. BAGGS, JR.
ALEXANDER SMITH
BY
ATTORNEY

2,978,857

United States Patent Office
Patented Apr. 11, 1961

2,978,857

LAWN MOWER AND PROPELLING VEHICLE

Alexander Smith, Box 1460, and Burton D. Baggs, Jr., 2429 Laurel Ave., both of Sanford, Fla.

Filed Sept. 26, 1958, Ser. No. 763,637

6 Claims. (Cl. 56—25.4)

This invention relates to the cultivation and care of grass and other growth of lawns and in various other locations where there are natural and manmade structures which constitute obstacles to the cutting of such grass when grown close to obstructions and must be periodically cut or trimmed.

The invention also relates to equipment employed in the cutting or trimming of the grass wherever it is found including about obstructions and where the terrain is irregular and it is necessary to cut close to such obstructions and to the ground and where large areas make it desirable for an operator to be seated while performing the necessary work.

Lawn mowers heretofore produced either have been incapable of cutting closely around obstructions or they have required great personal attention, effort and endurance in their use, the lawn mower of co-pending application No. 660,617, now U.S. Patent No. 2,857,728, being designed and produced to do close cutting but making no provision for transporting the operator.

It is an object of the invention to provide the combination of a lawn mower mounted on casters at one side and a substantially central wheel at the other in order to turn in a small radius with a power driven vehicle on which the operator can ride and by which one or more lawn mowers can be drawn simultaneously and with the capacity of the combination to cut close to an obstruction and to encircle such obstruction if desired, thereby making it possible to mechanize the usual tedious work of cutting and keeping cut a lawn where numerous obstructions are found.

Another object of the invention is to provide a combination lawn mower and vehicle with the latter carrying a power plant by which both the vehicle and the lawn mower may be driven and with means for reversing the drive of the vehicle or for rendering it or the lawn mower inoperative.

A further object of the invention is to provide a combination lawn mower and rideable power driven vehicle and to connect them by a pivot coupling or connection so that one may rotate about a transverse axis relative to the other to provide the necessary flexibility and resiliency and also to make it possible to provide a relatively simple, practical and inexpensive machine which can be operated forwardly or in a reverse direction and to drive a single cutter or which may be employed to drive a plurality of cutters and a swath corresponding substantially to the total combined cut of all of the cutters employed.

Another object of the invention is to provide a combination lawn mower and vehicle in which a single power device is utilized for driving both the cutter of the mower and for propelling the mower over the terrain, and with controls by which the cutter of the mower or the propulsion of the vehicle, both forward and reverse, may be independently controlled.

Figure 2:
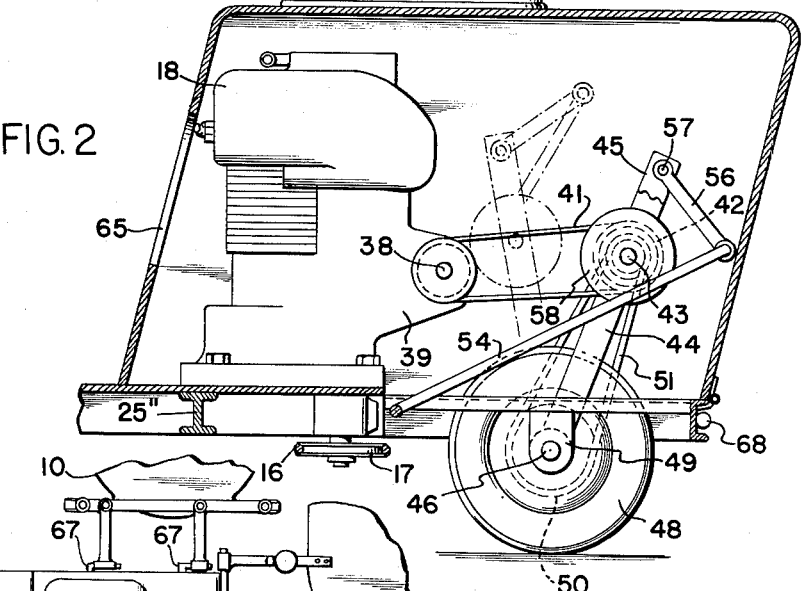
Figure 5:
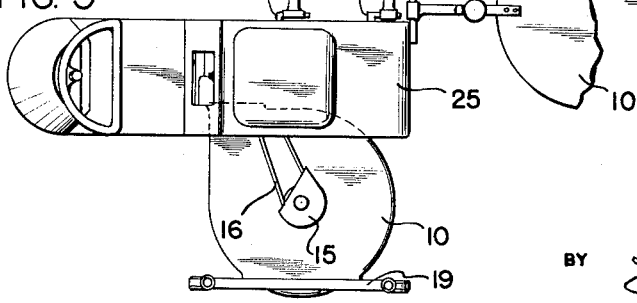

Other objects and advantages of the invention will be apparent from the following description taken in conjunction with the accompanying drawing wherein:

Fig. 1 is a side elevation illustrating one application of the invention;

Fig. 2, a side elevation of the rear portion of the machine slightly enlarged and with a part of the housing for the power plant and transmission broken away to reveal the interior;

Fig. 3, a top plan view with the top of the housing removed;

Fig. 4, an enlarged sectional detail taken on line 4—4 of Fig. 3 of the pivotal connection between the mower and the propelling vehicle; and Fig. 5, a top plan view on a reduced scale and with a couple of additional mowers attached.

Briefly stated, the invention is a lawn mower supported at one side by a pair of caster wheels and an intermediate wheel on the opposite side so that the mower may be maneuvered to cut close to an object. Also, a vehicle is provided for attachment to the mower and with a power plant with driving connections therefrom both to the cutter of the mower and to the wheels by which the vehicle is propelled over the terrain.

The mower and vehicle are connected by a transverse pivot about which one can rotate relative to the other, and the mower is driven and the wheels of the vehicle are propelled from the power plant of the vehicle, the cutter of the mower being driven by a belt and the vehicle being propelled by a drive from the power plant including reduction gearing pulleys and belts and a series of controls by which the driving and driven parts are coupled together or released one from the other.

With continued reference to the drawings the present invention is a power-driven device and a self-propelled vehicle from which power is supplied for driving said device. By way of illustration the device of the present invention is a lawn mower on the order of that disclosed in co-pending application Serial No. 660,617, filed May 21, 1957, now U.S. Patent No. 2,857,728, and comprising a housing 10 having an opening 11 to expose a cutter 12 at one side and making it possible to cut grass or other growth close to an obstruction.

The cutter 12 is located within the housing 10 and is adjustably attached to a vertical shaft 13 in and projecting through and above the housing or deck 10 and having fixed on the upper end thereof a pulley 14 within a guard 15 and driven by a belt 16 from a pulley 17 of a power plant 18.

The housing or deck 10 of the mower is supported at one side by a bar or yoke 19 fixed to the housing 10 of the mower and mounted on casters 20. The housing 10 of the mower is supported at its opposite sides by a transverse pivot 21 mounted in a pair of posts 22 on the housing 10 and with the pin 21 secured in such posts 22 by means of set screws 23. A bearing sleeve 24 is carried on the pivot pin 21 and in turn is supported by the housing 25 of a vehicle driven by the motor 18. The bearing 24 is additionally supported by means of a longitudinally disposed supporting bar 26 having its lower edge attached to the horizontal portion or deck of the housing 25 mounted on a frame or chassis 25'.

The belt 16 which drives the cutter heads of the mower is normally slack so that the pulley 14 and cutter 12 do not rotate. In order to cause rotation of such cutter, tensioning means is provided in the form of an idler pulley 27 mounted on a T-shaped bar 28 by means of a pivot 29.

The mounting of the T-shaped bar is by one end of the T-shaped bar attached by a pivot 30 to a post 31 on the housing 10. The opposite end of the T-shaped bar is attached by a pivot 32 to one end of a link 33, the other end of which link is pivotally attached to a lever 34 mounted on a bearing sleeve 35, carried by a pin 36, mounted on a post 37 which in turn is secured to the housing 10.

The power plant 18 is provided with a power take-off including a shaft 38 for propelling the vehicle. The shaft 38 extends on both sides of and is driven by the reduction gearing 39 from the power plant 18.

A double pulley 40 is mounted on each end of the shaft 38 and one pulley of each double pulley is employed to drive a belt 41, which drives a pulley 42 mounted on a shaft 43 journaled in arms 44 and 45, pivotally carried on axle 46 supported by central wheels 47 and 48. The ends of axle 46 are journaled in lugs 49 which support the rear end of the vehicle. Power to rotate the wheels 47 and 48 is supplied by a sprocket 50 mounted on axle 46 intermediate wheels 47 and 48, such sprocket being driven by a chain 51 from a sprocket 52 mounted on shaft 43.

In order to reverse the direction of travel of the vehicle, a lever 53 is provided mounted on an offset substantially Z-shaped rod 54. The lower portion of the rod 54 is pivotally supported by a bearing sleeve 55 mounted on the horizontal portion or deck of the housing 25, the intermediate portion extends substantially at right angles to the lower portion and the upper portion extends generally at right angles to the intermediate portion and parallel to the direction of the lower portion. The upper portion of the rod 54 is pivotally connected to a link 56 which has its opposite end pivotally attached to a tie rod 57 between the upper ends of arms 44 and 45. By operating lever 53, connecting rod 54 will move pulleys 42 out of engagement with the drive belts 41 and move the discs 58, mounted on shaft 43 adjacent pulleys 42, into engagement with the second pulley of the double pulleys 40 (Fig. 2) to drive the wheels 47 and 48 in the reverse direction.

The frame of the vehicle 25' having cross bars 25" is supported at its front by a wheel 59 mounted on a rotatable fork 60 attached to a steering post 61 and provided with a steering wheel 62. A housing 63 may be employed and enclose the lower portion of the post 61 and the upper portion of the fork 60. The steering wheel 62 is spaced appropriately from an operator's seat 64 on the housing 25 in which the power plant and transmission mechanism is contained, the housing having an opening 65 at its forward end and screened side openings 66 for the admission of air to cool the power plant during the operation of the same.

If desired, the vehicle may be employed to propel additional mowers and to accomplish this purpose it may have a longitudinal pair of brackets 67 mounted on the side of the vehicle opposite the mower and with pivot portions parallel to the axis of the vehicle and a third bracket 68 welded or otherwise attached to the rear of the vehicle with a pivot portion transverse to the axis of the brackets 67. As illustrated in Fig. 5 additional mower units 10 may be connected to these pivot portions in a manner that such additional mower units may follow the contour of the ground while permitting the mechanism to travel in a circular path. The additional mower units may be self propelled or may be run by the vehicle.

It will be apparent from the foregoing that a relatively simple inexpensive and efficient mower and propelling vehicle are provided, the mower being comprised primarily of a housing supported at one side by spaced casters and having a pivotal connection to the vehicle at the opposite side intermediate the longitudinal spacing of the casters. Also the mower has a vertical shaft mounted at the center of the housing to which is secured at its lower end a rotatable cutter blade and with a pulley fixed to the shaft above the housing which may be driven by a belt or the like and with such pulley protected by a guard to avoid injury by contact with the belt and to maintain the belt in place.

The pivoted wheel of the vehicle is located at the front and the steering wheel is located above the same for steering the vehicle by an operator on a seat on the rear of the vehicle, such seat being supported by a housing in which the transmission mechanism of the vehicle is disposed. Beneath the forward portion of the housing is mounted a power plant which is utilized for driving the mower and for propelling the vehicle so that the transmission of power from the power plant to the mower and the wheels of the vehicle to propel the same is relatively simple, practical and relatively inexpensive and the controls make it possible to cause the vehicle to travel forwardly and rearwardly or at a sharp angle subject to the control of the operator, with the cutter employed to cut close to an obstruction through the opening 11.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A power operated lawn mower comprising a vehicle having a steerable front wheel and a power driven rear wheel in substantial alignment, a laterally extending mower frame having cutter means thereon for mowing vegetation, said laterally extending frame being pivotally connected to said vehicle on a transversely extending pivot, and caster wheel support means on said laterally extending mower frame whereby said vehicle will be maintained in upright position and said mower frame will adapt itself to the contour of the surface being mowed.

2. The invention according to claim 1 in which the power means on said vehicle is connected to the cutter means on said mower frame for driving said cutter means.

3. The invention according to claim 2 in which means are provided for controlling the driving operation of said driven rear wheel of said vehicle.

4. The invention according to claim 1 in which power means provide for driving the rear wheel and means are provided for selectively driving the rear wheel in forward or reverse direction.

5. The invention according to claim 1 in which the caster wheel support means include one caster wheel in front of the transversely extending pivot and another caster wheel rearwardly of said transversely extending pivot.

6. The invention according to claim 5 in which the transversely extending pivot is substantially in alignment with the axis of the rear wheel of the vehicle.

References Cited in the file of this patent

UNITED STATES PATENTS

| | | |
|---|---|---|
| 2,465,405 | Strawn | Mar. 29, 1949 |
| 2,474,085 | Albright | June 21, 1949 |
| 2,682,740 | Miller et al. | July 6, 1954 |
| 2,712,857 | Jackson | July 12, 1955 |
| 2,795,914 | Smith | July 18, 1957 |
| 2,801,510 | Colburn | Aug. 6, 1957 |
| 2,833,367 | Pool et al. | May 6, 1958 |
| 2,877,618 | Thornton-Trump | Mar. 17, 1959 |